Figure 1:
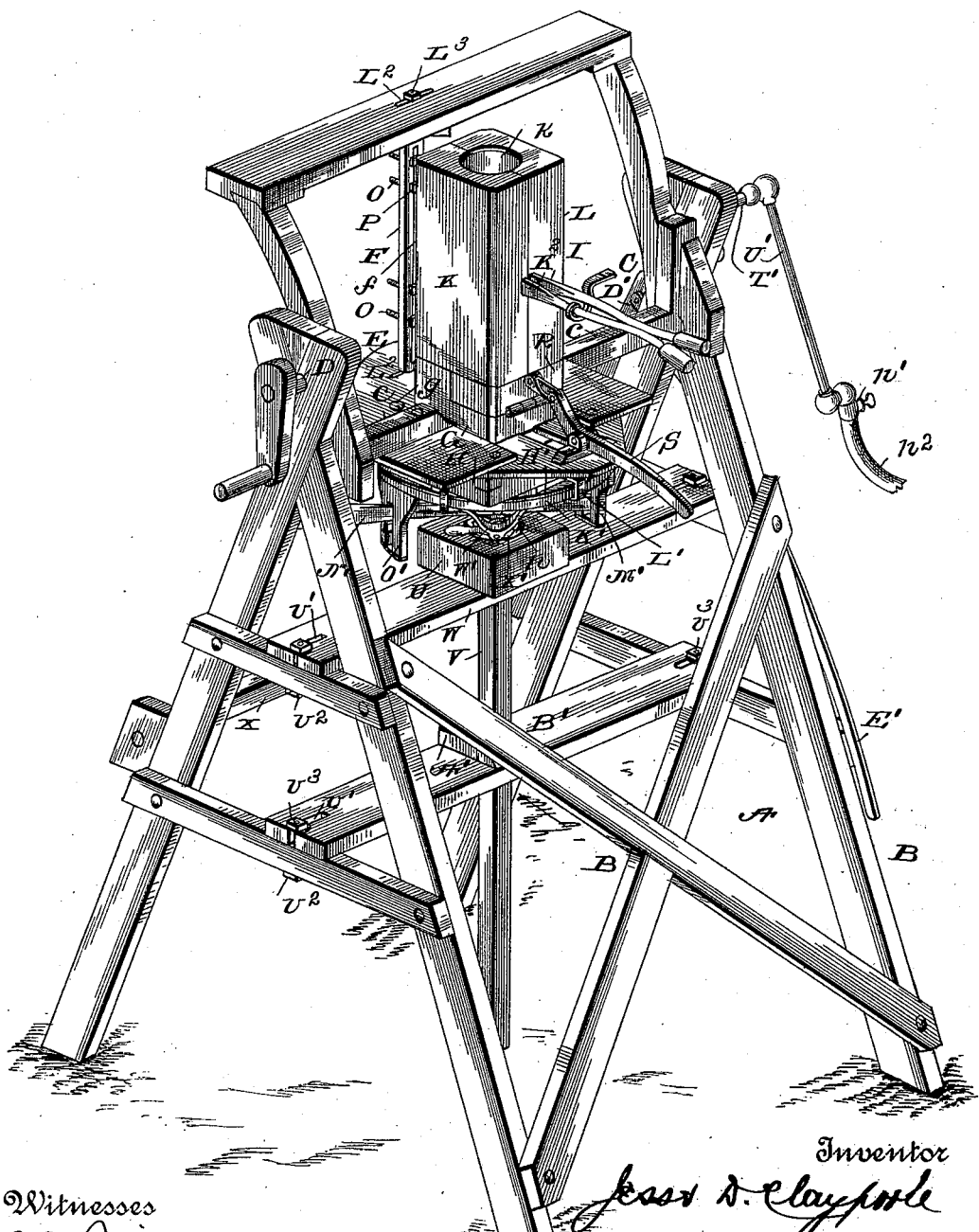

(No Model.) 4 Sheets—Sheet 1.

J. D. CLAYPOOLE.
MOLD FOR MAKING GLASS ARTICLES.

No. 539,168. Patented May 14, 1895.

Witnesses
Inventor
Jesse D. Claypoole
By his Attorney (No Model.) 4 Sheets—Sheet 2.
J. D. CLAYPOOLE.
MOLD FOR MAKING GLASS ARTICLES.
No. 539,168. Patented May 14, 1895.
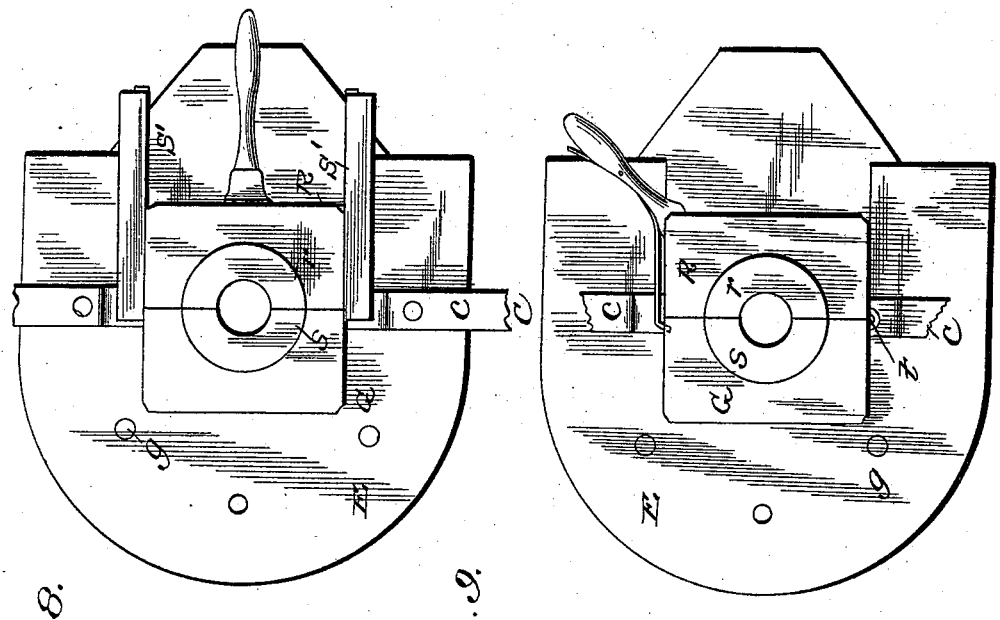
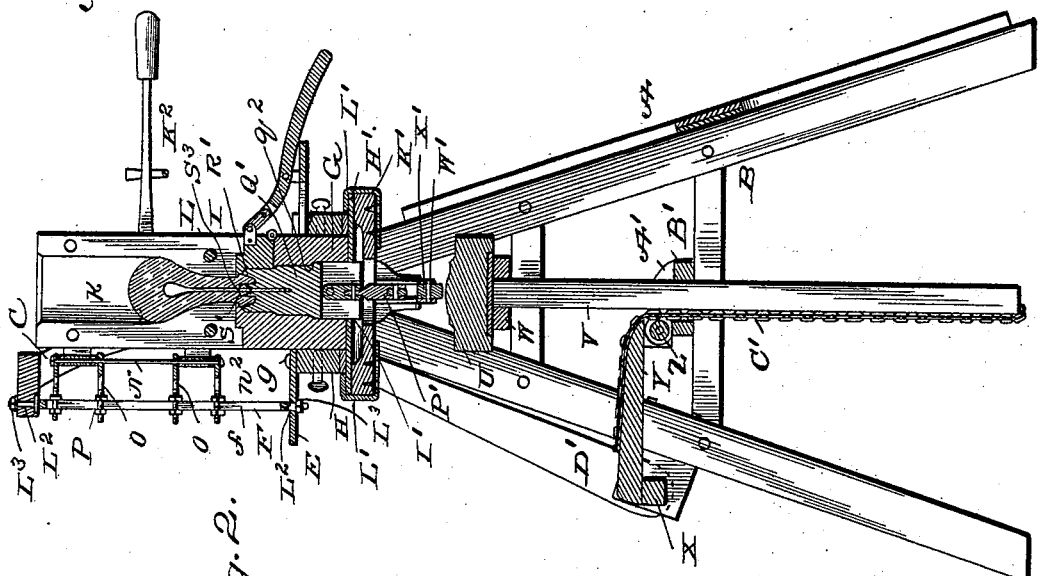

(No Model.) 4 Sheets—Sheet 3.
J. D. CLAYPOOLE.
MOLD FOR MAKING GLASS ARTICLES.
No. 539,168. Patented May 14, 1895.
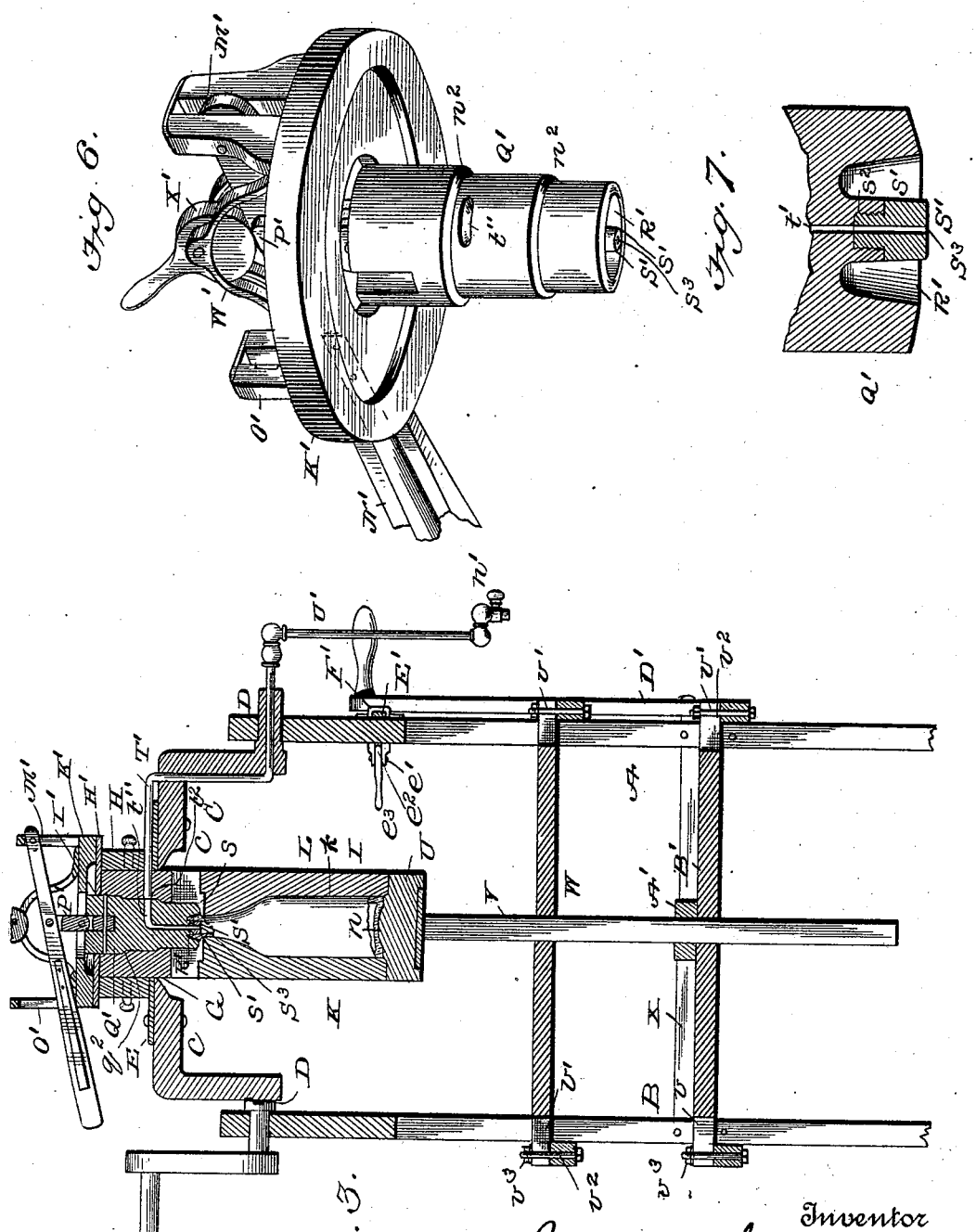
Witnesses
Inventor
Jesse D. Claypoole
By his Attorney

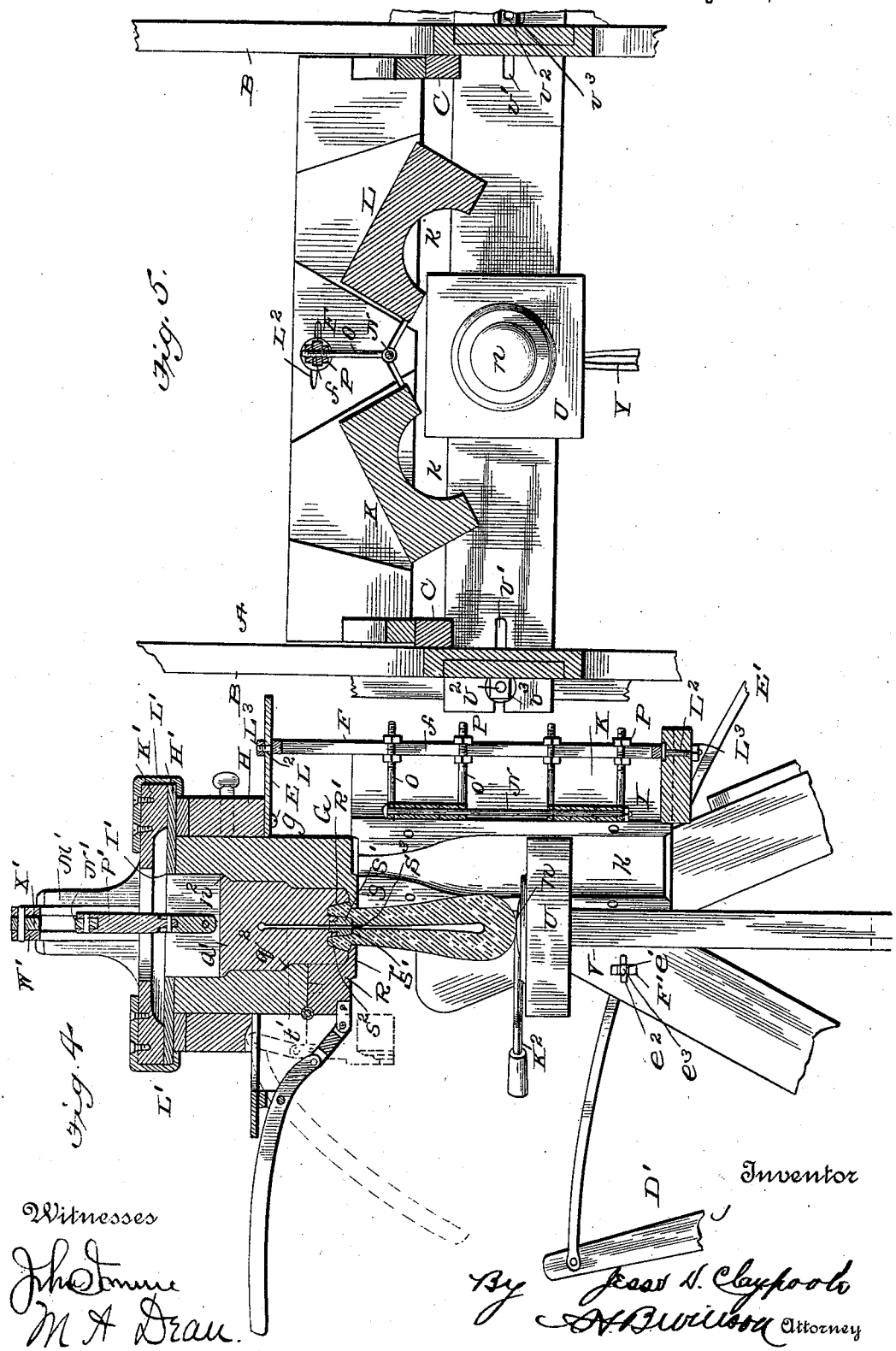

UNITED STATES PATENT OFFICE.

JESSE D. CLAYPOOLE, OF PENN'S GROVE, NEW JERSEY.

MOLD FOR MAKING GLASS ARTICLES.

SPECIFICATION forming part of Letters Patent No. 539,168, dated May 14, 1895.

Application filed July 13, 1894. Serial No. 517,394. (No model.)

*To all whom it may concern:*

Be it known that I, JESSE D. CLAYPOOLE, a citizen of the United States, residing at Penn's Grove, in the county of Salem and State of New Jersey, have invented certain new and useful Improvements in Molds for Making Glass Articles; and I do declare the following to be a full, clear, and exact description of the invention, such as will enable others skilled in the art to which it appertains to make and use the same.

My invention has relation to molds for use in the manufacture of glass articles and especially bottles, jars, &c., and among the objects sought to be attained is to provide a mold for use as described which is of extremely simple and inexpensive construction, and which is adapted to be readily operated, and with the above and other objects in view, all of which will be hereinafter seen, my invention consists in the novel construction, arrangement and combination of parts, as hereinafter fully described, illustrated in the drawings and pointed out in the appended claims.
In the accompanying drawings, Figure 1 is a perspective view. Fig. 2 is a central section, the parts being in the position they assume at the commencement of the molding operation. Fig. 3 is a similar section at right angles to Fig. 2, the parts being in the position they assume during the blowing of the article. Fig. 4 is an enlarged central section illustrating the tamper or bottom of the mold in the action of tamping the glass. Fig. 5 is a detail cross-section of the mold, showing the same open. Fig. 6 is a detail perspective view of the gaffer device. Fig. 7 is a detail sectional view of the plunger, showing the detachable nozzle. Figs. 8 and 9 are details of modifications.

In carrying out my invention I provide any suitable means for supporting the operative parts of my device, and in this instance I show a suitable supporting frame A, adapted for that purpose. I preferably construct the frame with the angularly arranged side bars B suitably braced together, and in said side bars at their upper ends is journaled a frame C which carries the mold proper as presently described. Said frame C is provided with the side journals D which are rotatably mounted in the side posts of frame A. To the arms c of the frame C is fixedly secured a plate E which is provided with a standard F slotted at *f* and to said plate E is bolted a block G. Through said block G pass bolts *g* which impinge against a block H to hold the latter securely yet removably in position.

The mold proper, I, comprises the sections K, L, (having suitable operating handles K²) which may be suitably hinged together to adapt said sections to be readily swung apart horizontally as usual to permit of the removal of the blown article and having suitable locking means to lock the sections when closed together.

I preferably hinge the sections of the mold in such manner as to permit the same to accomplish the described object and at the same time permit said mold to be readily adjusted vertically upon its support. For this purpose I hinge said sections upon the vertically arranged pintle rod N integral with or secured to horizontally arranged screw bolts O which pass through the slot *f* of the standard F and which bolts O are provided with nuts P whereby when said nuts are tightened up against the standard F, the pintle rod and mold sections will be firmly held in position, and when said nuts are loosened said pintle and mold sections may be readily adjusted vertically for the purpose of maintaining a close fitting or joint between the edges of the mold sections K L and the block H. By extending the upper and lower ends of the standard through slots L² L² in the plate E and a cross piece of the frame and providing tightening nuts L³ on said ends of the standard the latter may be adjusted laterally.

The mold sections K L are provided interiorly each with a cavity or depression *k* which when the sections are closed together, form a cavity of the shape of the bottle or jar which it is desired to produce. If desired each of the mold sections may be provided in its wall with words, letters, &c., in intaglio, which therefore will appear in relief on the blown article.

To the block G is hinged a section R which is provided with a raised semi-circular projection or shoulder *r* which lies flush with a similar shoulder *s* formed on the block G and said block G and section R are cut away interiorly to provide an annular opening *s'* when the section R is in its closed position. The section R is adapted to be thrown open or outwardly from the block G by any suitable means, as for instance by a lever S pivoted to the plate E for a purpose presently to be seen; or instead of hinging the section R as seen, I may hinge the same at its side edge as seen at $t$ in Fig. 9 so that said section may be swung horizontally; or said section may be fitted to slide in a suitable guideway S' secured to the plate E whereby said section may be slid horizontally outward from block G as shown in Fig. 8. U, indicates the bottom section of the mold proper, said section being secured upon the upper end of a rod V which passes vertically through the horizontal pieces W of the main frame and is adapted to be vertically reciprocated through said pieces W by any suitable means. Said bottom section U is provided upon its upper face with a raised projection $n$ which is of a configuration corresponding to the shape which it is desired to give to the bottom of the blown article and the diameter of which projection is such as to adapt it to fit snugly within the larger end of the opening in the mold sections as seen in Fig. 3. The purpose of the section is to support the mass of glass when between or within the mold sections while said glass is being blown to properly shape the article, and also to tamp gently the mass of glass as the same hangs within the mold before the blowing operation whereby the shape desired will be imparted to the bottom of the article.

As before stated the tamping or bottom section U may be vertically reciprocated to cause the same to tamp the mass of glass by any suitable means. I, however, preferably use the following described means: Pivotally mounted within the side bars of frame A, is a bar or rod X to which is secured one end of a bar Y whose opposite end extends forwardly to a point above a pulley Z which is pivotally mounted between bearings A' secured to the cross piece B' of the frame A. A rope or chain C' is secured at one end to the bar Y, and passes over the end of the said bar and thence over the pulley A' and is secured at its opposite end to the rod V. Upon one end of the rod X is secured a crank handle D' and by oscillating the said handle it will be seen that the rod X will be rocked thus causing the rod V and with it the bottom section U to be vertically reciprocated to effect the tamping of the glass.

Inasmuch as it is necessary during the blowing operation for the section U to be firmly held in an elevated position tightly against the lower edge of the mold sections with the shoulder $n$ fitting closely within the annular opening formed by the openings in the mold sections, I propose to employ suitable locking means for locking said section U in its said elevated position. The means that I have shown for this purpose consist of an arc shaped rod E' which is secured at one end to the crank handle D' and passes freely through an eye or staple F' which is loosely fitted in a side bar of the frame and has its inner end bent as at $e'$ and upon which end is rotatably mounted a cam $e^2$ having an operating handle $e^3$ so that by turning the cam to cause it to bind tightly against the inner face of the side bar, the staple will be drawn inwardly whereby it will bind or clamp the rod E' and thus hold the handle D' and consequently the section U tightly in any desired elevated position. By loosening the cam $e^2$ the rod E' will be released and the handle D' may be oscillated to effect the reciprocation of the section U.

To the block G is secured a bearing plate H' provided with a central opening I' aligning with the opening in the said block and rotatably mounted upon the said plate H' is a device adapted to smooth or gaffer the inner and outer surfaces of the neck of the article. Said device consists of an annular plate K' which is adapted to fit and rotate upon the plate H' said plate K' being held in proper position upon plate H' during its rotative movements by angle pieces L' which are secured to the plate K' and loosely engaged under the edge of the plate H'. The plate K' is provided with bearings M' between which is pivotally mounted one end of a lever N' which passes through and is guided by guides O' also secured to the plate K'. To the lever N' is pivotally secured a link P' to which is pivotally secured a cylindrical plug or plunger Q', within whose lower end is provided a recess R' which is adapted to completely form and finish the upper end or mouth of the bottle both upon its interior and exterior surfaces, said plug being provided with the central nozzle S' which projects down within the said neck of the bottle and gives the proper thickness to the walls thereof. I prefer to make the nozzle with a detachable section $s'$ as shown adapted to be screwed into the threaded portion $s^2$ of the same. I provide the nozzle with an air passage $S^3$ to permit the passage of the compressed air for the purpose of blowing the article as usual, and inasmuch as it is sometimes desirable to provide a variable number of air openings for permitting a variable quantity of air to act upon the article, my detachable nozzle adapts such variable quantity of air to be used as by unscrewing the same and substituting a nozzle having a greater or less number of air openings, the desired result may be attained.

For the purpose of using compressed air for blowing the article I provide the plug or plunger with a central bore $t'$ which communicates with the opening or openings in the nozzle, and said opening is extended at right angles as at $t''$ and adapted to register with an opening $t''$ provided in the block G which opening $t''$ in turn communicates with one end of an air pipe T' which extends through the frame C and through one of the journals of said frame and said pipe T' is rotatably connected with a pipe U' provided with a suitable stop-cock $n'$ and a pipe $n^2$ is connected with the pipe U′ and leads off to a suitable source of supply of compressed air, as a pump.

As before stated the function of the gaffer device is to smooth and make uniform the exterior and interior surfaces of the upper end of the article, and by its use I secure advantageous results, not possible if said gaffer were not employed, as it often happens in the usual class of molds, that after the glass has been poured into the mold the said glass becomes chilled before settling firmly down into the neck portion of the mold and consequently wrinkling or seaming of the mouth and neck of the article results.

By using my gaffer device, the workman can by oscillating or rocking the same immediately after the glass has been poured into the mold, cause the glass to settle firmly into its proper position and at the same time prevent wrinkling or seaming of the mouth or neck, such rocking movements also serving to chill the glass whereby the article will hang suspended from its shoulder or flange while the mold is reversed in position.

Inasmuch as it may in some instances be desirable to adjust the position of the bottom section of the mold laterally to some extent to make it co-operate properly with the other sections of the mold, I make the cross pieces of the frame through which the rod V passes adjustable laterally and for this purpose I provide the said cross pieces at their opposite ends with slots $v'$ through which project threaded bolts $v^2$ carrying tightening nuts $v^3$. Thus by loosening the nuts, the cross pieces may be adjusted laterally and then again tightened to hold the said pieces securely in their adjusted positions.

For the puspose of holding the lever N′ firmly in its depressed position to cause the shoulders $n^3$ of the plug or plunger Q′ to bind tightly against the shoulders $q^2$ formed within the block G whereby a tight joint is effected during the blowing operation which is a desirable feature, I provide a hood or bow shaped cap W′ secured to the plate K′ and straddling the lever N′, said cap being provided with a cam X′ adapted to bind against the upper edges of the link P′.

The operation of my device may be described as follows: Supposing the parts to be in the position represented in Figs. 1 and 2 which is the proper position at the commencement of the molding operation, the mold sections K L being closed and locked together, the glass is poured into the larger end of the opening formed by the openings in the said sections and fills the smaller end of said openings and settles around the nozzle of the plunger. I then open the stop cock of the air pipe and admit a small quantity of air which enters through the opening of the plug and forms a small cavity within the glass. I then shut off the supply of air, and then oscillate the gaffer device whereby the upper end of the article is smoothened or gaffered. The mold proper is then reversed into the position shown in Figs. 3 and 4 after which the mold sections K L are opened and the bottom section U of the mold is reciprocated to tamp the mass of glass. The sections K L are then again closed together and locked and the section U brought up firmly into position against the said sections K L and locked there. I then again admit compressed air until the glass within the mold has been blown to its proper shape. I then lower the section U, open the sections K L of the mold, raise the plunger of the gaffer device, swing the section R away from the sections K L and by means of a pair of pinchers, grasp the blown article and remove the same from the mold after which the mold may be closed and turned into its first position represented in Fig. 1 for the production of another article.

I would state that I may if desired provide two or more molds constructed similarly to the one hereinbefore described and construct a lengthened supporting frame carrying all the molds whereby I am enabled to effect the simultaneous reversal of all the molds and thus effect economy in time and labor. It will be understood that instead of using compressed air produced by a pump or other compressor I may simply blow the necessary air through the air pipe by the mouth, though I prefer the first arrangement. Such modification in the arrangement of parts may however be resorted to without departing from the principle of the invention.

It will be understood that my device may be equally well adapted for molding articles from various other materials besides glass if so desired.

Having thus described my invention, what I claim, and desire to secure by Letters Patent, is—

1. The combination with a suitable support, of a frame provided with journals rotatably mounted in said support a mold carried by said frame and comprising hinged sections adapted to swing horizontally, and a gaffer device carried by the said frame and comprising a plug adapted to be rotated to effect the gaffering of the interior and exterior surfaces of the upper end of the article in the manner described.

2. The combination with a suitable support, of a frame provided with journals rotatably mounted in said support, a mold carried by said frame and comprising hinged sections adapted to swing horizontally, and a gaffer device carried by the said frame and comprising a plate provided with a central annular opening, a lever pivotally secured to said plate, and a plug suspended from said lever, and adapted to be reciprocated vertically thereby, said plate and plug being adapted to be rotated to gaffer the interior and exterior surfaces of the upper end of the article within the mold.

3. The combination with a suitable support, of a frame provided with journals rotatably mounted in said frame a mold carried by said frame and comprising sections hinged together and adapted to swing horizontally, a block and a section hinged thereto and adapted to confine the lower portion of the neck of the bottle, a bottom or tamping section adapted to be vertically reciprocated for the purpose stated and to occupy a position against the lower end of the mold sections, and a gaffer device comprising a plug and adapted to form the mouth of a bottle and to be rotated to effect the gaffering of the interior and exterior surfaces of the upper end of the bottle in the manner described.

4. The combination with a suitable support, of a frame provided with journals rotatably mounted in said frame a mold carried by said frame and comprising sections hinged together and adapted to swing horizontally and a bottom or tamping section adapted to be vertically reciprocated for the purpose stated and to fit against the lower end of the mold sections, and a gaffer device comprising a plug adapted to be rotated to effect the gaffering of the interior and exterior surfaces of the upper end of a bottle, said plug being provided with an air passage in communication with a suitable supply of air as described.

5. The combination with a suitable support, of a frame provided with journals rotatably mounted in said frame, a mold carried by said frame and comprising sections hinged together and adapted to swing horizontally, and a bottom or tamping section adapted to be vertically reciprocated for the purpose stated and to fit against the lower end of the mold sections, and a gaffer device comprising a plug adapted to be rotated to effect the gaffering of the interior and exterior surfaces of the upper end of a bottle, a detachable nozzle carried by said plug and provided with air openings in communication with a suitable supply of air as described.

6. The combination with a suitable support, of a frame provided with journals rotatably mounted in said frame, a mold carried by said frame and comprising sections hinged together and adapted to swing horizontally, and a bottom or tamping section adapted to be vertically reciprocated for the purpose stated and to fit against the lower end of the mold sections, and a gaffer device comprising a plug adapted to be rotated to effect the gaffering of the interior and exterior surfaces of the upper end of a bottle, said plug being provided with an air passage in communication with the interior of the mold, an air supply pipe in communication with said air passage, and passing through one of the journals of the frame and a stationary air pipe rotatably connected with said first air pipe and provided with a stop cock as described.

7. The combination with a suitable support, of a frame provided with journals rotatably mounted in said support, a mold carried by said frame and comprising hinged sections adapted to swing horizontally, a slotted standard, threaded bolts carried by the hinge pin and extending through the slot of the standard, and nuts carried by said threaded bolts all arranged and adapted to permit of the vertical adjustment of the mold sections, as described.

8. The combination with a suitable support, of a frame provided with journals rotatably mounted in said support, a mold carried by said frame and comprising hinged sections adapted to swing horizontally, and a gaffer device comprising a plug adapted to be rotated to effect the gaffering of the interior and exterior surfaces of the upper end of the bottle, said plug being provided in its interior with an air passage in communication with the interior of the mold sections, said air passage extending laterally through the plug and in communication with a supply of air.

9. The combination with a suitable support, of a frame provided with journals rotatably mounted in said frame a mold carried by said frame and comprising sections hinged together a slotted standard, means for adjusting said standard laterally, threaded bolts carried by the hinge pin and extending through the slot of the standard, and nuts carried by said threaded bolts, all as described.

In testimony whereof I affix my signature in presence of two witnesses.

JESSE D. CLAYPOOLE.

Witnesses:
M. A. DEAN,
M. E. COWELL.